United States Patent
Rezzi et al.

(10) Patent No.: US 6,201,652 B1
(45) Date of Patent: Mar. 13, 2001

(54) METHOD AND APPARATUS FOR READING AND WRITING GRAY CODE SERVO DATA TO MAGNETIC MEDIUM USING SYNCHRONOUS DETECTION

(75) Inventors: Francesco Rezzi, San Jose; Hakan Ozdemir, Campbell, both of CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/087,364

(22) Filed: May 29, 1998

(51) Int. Cl.[7] .................................................. G11B 5/09
(52) U.S. Cl. ................... 360/40; 360/49; 714/795
(58) Field of Search .................... 360/77.08, 40, 360/48, 49, 53; 341/51, 50, 97; 375/341; 714/786, 795

(56) References Cited

U.S. PATENT DOCUMENTS

| | | |
|---|---|---|
| 5,291,499 * | 3/1994 | Behrens et al. ................... 714/796 |
| 5,343,340 | 8/1994 | Boutaghou et al. . |
| 5,384,671 | 1/1995 | Fisher . |
| 5,600,499 | 2/1997 | Acosta et al. . |
| 5,661,760 * | 8/1997 | Patapoutian et al. ......... 360/77.08 X |
| 5,737,142 * | 4/1998 | Zook ................................. 360/40 X |
| 5,881,106 * | 3/1999 | Cartier .............................. 375/262 |
| 6,005,727 * | 12/1999 | Behrens et al. ................... 360/40 X |

OTHER PUBLICATIONS

Viterbi Detection, Chapter 7 (publisher and publication date unknown).

* cited by examiner

Primary Examiner—Andrew L. Sniezek
(74) Attorney, Agent, or Firm—Theodore E. Galanthay; Lisa K. Jorgenson; Bryan A. Santarelli

(57) ABSTRACT

A method for synchronously detecting servo information from a data disk includes reading servo information from a disk and passing the servo information signal through a Viterbi detector. The disk is encoded in a known data format from Gray code data to obtain a servo information signal, the encoded Gray code data being constrained to allow no more and no fewer than two "1" states to sequentially occur. The Viterbi detector is modified to eliminate state changes that do not occur within the constrained encoded Gray code data.

17 Claims, 6 Drawing Sheets

III

ENCODING AND DECODING TABLE

| UNCODED 4 BITS WORD | CODED PATTERN |
|---|---|
| 0000 | 001100110000 |
| 0001 | 001100110011 |
| 0010 | 001100000110 |
| 0011 | 001100000011 |
| 0100 | 000110001100 |
| 0101 | 000110011000 |
| 0110 | 001100001100 |
| 0111 | 001100011000 |
| 1000 | 000000110000 |
| 1001 | 000000110011 |
| 1010 | 000001100110 |
| 1011 | 000001100011 |
| 1100 | 000110000110 |
| 1101 | 000110000011 |
| 1110 | 000011000110 |
| 1111 | 000011000011 |

*Fig. 7*

GRAY CODE LENGTH PROGRAMMABILITY

| SGC_REG[4:3] | GRAY CODE LENGTH | CHANNEL BITS LENGTH |
|---|---|---|
| 00 | 16 | 48 |
| 01 | 20 | 60 |
| 10 | 24 | 72 |
| 11 | NOT USED | -- |

*Fig. 8*

METHOD AND APPARATUS FOR READING AND WRITING GRAY CODE SERVO DATA TO MAGNETIC MEDIUM USING SYNCHRONOUS DETECTION

BACKGROUND OF THE INVENTION

1. Field of the Invention

This invention relates to improvements in methods and apparatuses for reading Gray code data from mass data storage systems of the type that use synchronous data detection, and more particularly to improvements in methods for the detection of track and sector identification information in a Gray code containing field of a servo sector of the data media of the data storage system in which the method is practiced.

2. Relevant Background

Recently, there has been increased emphasis in the mass storage industry, and a concomitant increased demand among consumers, for larger and larger mass storage devices. For example, the sizes of magnetic hard disk drive devices have been increasing to the point at which even new entry level computers now have a disk storage capability of at least 1 Gbyte, and most computers have disk storage capabilities in excess of 3 Gbytes, and even more. At the same time, disk drive manufacturers are working to reduce the costs of their disk drive products, in order to keep the overall cost of their products affordable. Thus, despite the significant increase in disk drive capacity, disk drive product prices are continually being reduced.

One way by which costs have been reduced and disk capacities increased is through the use of denser data formats on the data media, a direction to which the industry is trending. However, as a result of such denser data provisions, when the data is read from the data media, the data signals are becoming less and less discrete, and distinguishing them, one from another, is becoming more and more difficult. Consequently, the data pulses that are detected are beginning to have greater and greater intersymbol interference, commonly referred to as ISI.

This poses a problem at the very least to the detection of the information contained in the device that identifies the tracks and sectors, and provides information by which the data reading head can be positioned. More particularly, as background, computer mass storage devices have at least one, and often a plurality of, heads for reading, and often writing data, to the data media. The heads are selectively positionable over selectable concentric circles of data recorded on the media of the drive. The concentric circles are referred to as tracks, and the portion of each concentric circle or track that contains data on a particular rotating media is referred to as a sector.

In order to position the magnetic or other data-reading head over the desired track and sector, data that identifies each individual track and sector is encoded on the data media in a special field, usually at the beginning of each sector. Thus, when the head is moved to a particular track, and the track/sector identifying data is read, the position of the head can be determined. It can be further determined whether the sector and track over which the head is positioned is the desired sector and track from which data is desired to be read and/or written.

Typically, this identification and position information is contained in Gray code data written into the fields associated with the respective tracks and sectors. As implied above, one goal of the system is to recover the position information contained in the servo field of the mass media device in order to determine the position of the head on the disk surface and to provide the controller the instantaneous Position Error Signal (PES) and Gray code.

One of the well-known characteristics of a Gray code is that the bits of successive Gray code words differ at most by only one bit. Thus, when Gray code encoding is used to identify successive sector and track information, the encoded data of adjacent tracks differ at most by one bit. The reason for this choice is that during the process of positioning the head, particularly during a coarse track seek operation in which the servo positioning system is moving the head across on the surface of the disk coarsely seeking the proper track location, if the data of a Gray code field differs from the desired field by only one bit, then the uncertainty in the track identification is at most ±1 track. This is because this information might be read either when the head is still moving and crossing over two adjacent tracks or when it is not positioned accurately on the track center. For this reason the decoding of the Gray code provides only a coarse information on the position of the head. Fine positioning may then be achieved by demodulating the amplitude of a series of bursts after the Gray code field. These bursts are usually placed in an off-track pattern which may differ for each servo system. The amplitude of each burst gives an indication of the relative position of the head with respect to the track center that can be used by the servo controller to generate a PES used to correct the head position.

Two main primary techniques exist for reading Gray code information. The two techniques are usually referred to as synchronous and asynchronous. Early systems used the asynchronous technique almost exclusively. In the asynchronous technique a field containing AGC information is written before the Gray code field. The AGC information is used to adjust the amplitude of the read back signal before detection. A peak detector then detects the peaks of the flux changes in the magnetization pattern written on the disk. Circuitry in the channel then qualifies the peaks, and provides the information to the controller. Based on the identification of the peaks in the read-back signal and eventually their sign, the controller is able to recover the Gray code pattern and determine the track number.

In a synchronous servo channel, the information from the Gray code field is read with a technique similar to that used to decode the actual data information in the sector. This technique requires not only an amplitude recovery before the detection, but also requires a time recovery to synchronize the channel to the incoming data. One advantage of synchronous detection is that it is possible to use the same recovery circuits that are used in the data recovery mode. Another advantage is that using a Viterbi detector to decode the information (below discussed), the Gray code can be provided directly to the controller without a need for further processing. Additionally, the same fast NRZ interface of data mode can be used to communicate with the controller. (NRZ refers to "non-return to zero", and refers to a data transmitting technique in which the data is encoded according to a particular known state change transition in dependence upon the states of successive data bits.)

It can be seen, however, that if the Gray code data is extracted by decoding the data in the Gray code field and by demodulating the amplitude of a series of periodical pattern (bursts) written on the disk, if the data has a high ISI which cannot be accurately resolved, the precise location of the head cannot be properly identified or established. This results, of course, in undesirable device operation. Thus, in the past, in order to detect the data symbols read from the data media which have a high ISI level, it has been proposed to use a "Viterbi" detector, which is capable of separating the desired recorded symbols. Viterbi detectors are known in the art, and their operation and construction is described in Bergmans, J. W. M., *Digital Baseband Transmission and Recording*, pages 301–315, 1996, which is incorporated herein by reference.

Severe ISI in today's high density data storage systems eliminates the possibility of having one isolated peak associated with each magnetic flux change as the head traverses over the magnetic media. Instead, the shape of the read-back voltage is determined with a series of magnetic transitions on the disk. The Viterbi algorithm is a sequence estimator that chooses the maximum likely data sequence on the disk from all probable data sequences to create the observed read-back waveform.

The Viterbi algorithm is performed by a number of "Add-Compare-Select" (ACS) hardware units, each associated with a unique sequence of binary data on the disk. The length of the sequence is dictated by the severity of the ISI. In a standard Viterbi detector, the number of states (or the number of required ACS units) is the length of the sequence to be detected raised to the power of 2. Thus, as the ISI gets more severe, the circuit area is increased and the circuit arrangement increases in complexity in an exponential fashion.

SUMMARY OF THE INVENTION

In light of the above, therefore, it is an object of the invention to provide an improved method for reading Gray code data in magnetic data storage systems of the type that use synchronous data detection.

It is another object of the invention to provide an improved method of the type described for detecting track and sector identification information in a Gray code containing field of a servo sector of the magnetic media of the data storage system in which the method is practiced.

It is another object of the invention to provide an improved Viterbi detector for use in conjunction with a mass storage device of the type in which data position information location is identified by Gray code data.

It is yet another object of the invention to provide an improved Viterbi detector that has reduced state transitions, to simplify the Viterbi construction and increase the speed of Viterbi detection.

These and other objects, features and advantages of the invention will be apparent to those skilled in the art from the following detailed description of the invention, when read in conjunction with the accompanying drawings and appended claims.

Thus, according to a broad aspect of the invention, a method is presented for synchronously detecting servo information from a data disk. The method includes reading servo information from the disk that has been encoded in a known data format from Gray code data to obtain a servo information signal which has at least some prohibited adjacent data state combinations. The Gray code data may be encoded in a number of ways. For example, the encoded Gray code data may be Gray code data that has been encoded using a 4:12 run-length code that satisfies a constraint wherein a number of 0's in a row cannot be more than 10 and less than 2. The encoded Gray code may be further constrained, for example, to allow no more than two "1" states to sequentially occur. The servo information signal is then passed through a Viterbi detector that has been modified to eliminate state changes that would be caused by the prohibited adjacent data state combinations.

According to another broad aspect of the invention, a method is presented for synchronously reading Gray code servo information from a data disk. The method includes reading encoded Gray code data from the disk and detecting the encoded Gray code data in a Viterbi detector having only permissible state change transitions that are permitted by a Gray code data encoding scheme to produce detected encoded Gray code data.

According to another broad aspect of the invention, a method is presented for operating a mass storage device of the type having a rotating media. The rotating media has a plurality of data containing locations, and a corresponding plurality of identification locations for containing information to identify associated ones of the data containing locations. The information to identify associated ones of the data containing locations includes location code data at each identification location that follows a Gray code scheme among successive identification locations. A data head is selectively positionable adjacent the media for at least reading data from the data containing locations. The method includes locating the head to a data containing location at an actual head position and reading encoded location code data with the head from an identification location corresponding to the actual head position to produce a read encoded location code data signal, the encoded location code having at least some prohibited adjacent data states. The read encoded location code data signal is detected using a Viterbi detector which allows state transitions only to states that would not be produced by the prohibited data states to produce a detected encoded location code data signal. The detected encoded location code data signal is decoded to recover Gray code location data, and from the decoded Gray code data, it is determined whether the actual head position is a desired head position. If the actual head position is the desired head position information is then read from the data containing location. If the present location is not the desired head position, the steps are repeated from the act of locating.

According to still another broad aspect of the invention, a method is presented for writing servo information to a data disk for synchronous detection. The method includes encoding servo information from Gray code data to obtain encoded servo information that has at least some prohibited adjacent data state combinations. The encoded servo information is then written to servo sectors of a data media to identify the servo sectors. The encoded servo information signal may be detected by passing said encoded servo information through a Viterbi detector that has been modified to eliminate state changes that would be caused by the prohibited adjacent data state combinations. The act of encoding may be performed by encoding the Gray code using a 4:12 run-length code that satisfies a constraint wherein a number of 0's in a row cannot be more than 10 and less than 2. The encoded servo information may be further constrained to allow no more and no less than two "1" states to sequentially occur.

BRIEF DESCRIPTION OF THE DRAWINGS

The invention is illustrated in the accompanying drawings, in which:

FIG. 7 is an example of a look-up table for an encoder to encode the magnetization patterns shown in FIG. 6, in accordance with the preferred embodiment of the invention.

And FIG. 8 is a table showing Gray code length programmability, indicating channel bit length for respective Gray code lengths.

In the various figures of the drawing, like reference numerals are used to denote like or similar parts.

DETAILED DESCRIPTION OF THE PREFERRED EMBODIMENTS

Figure 1:
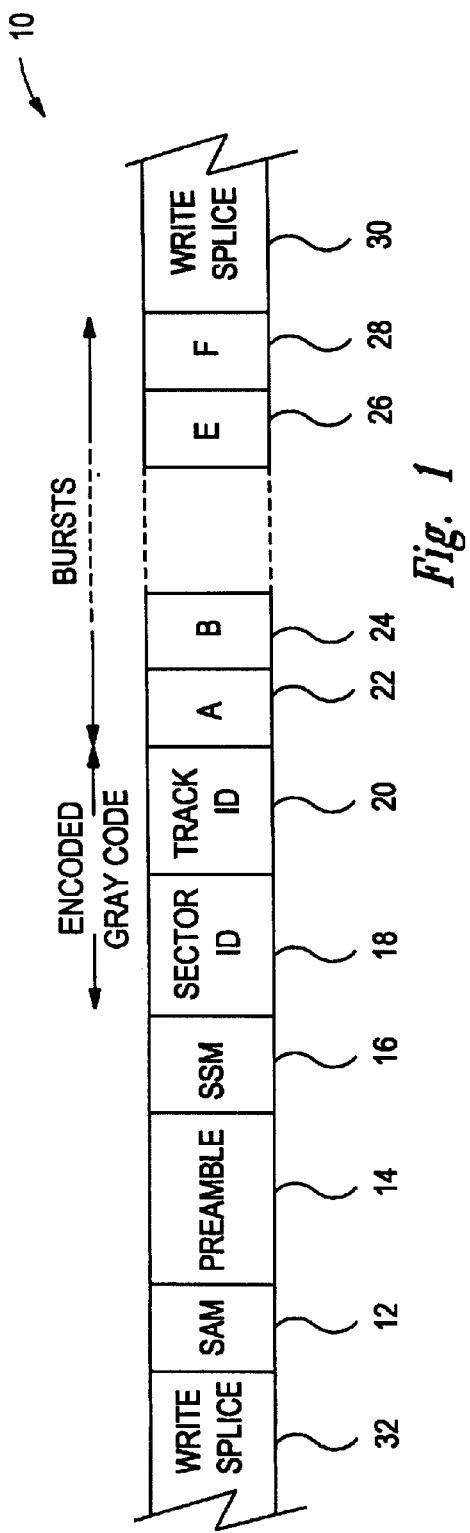
FIG. 1 is a diagram illustrating a typical format of data written onto a data media for containing encoded Gray code information, identifying a particular data track or recording path, in accordance with a preferred embodiment of the invention.

According to a preferred embodiment of the invention a method to write and detect embedded servo information from a rotating disk of a mass storage device, such as, for example, hard disk drives, CD ROM drives, DVD drives, and the like, is presented. Particularly, the method of the invention provides for the detection of track and sector ID, which are usually written in the Gray code field of the servo sector. A servo-synchronization mark (SSM) is used to mark the beginning of the Gray code field, and a bit by bit correlator is used to identify the SSM in order to begin the decoding of the Gray code.

Typically, the SSM presents a reserved word three bytes in length that complies with certain code constraints. It can be therefore detected by a servo Viterbi detector, such detectors being well known and widely used in the art, as described above. To make the SSM detection more probable, even in presence of very poor signal-to-noise ratio, a fault tolerant rule can be set by the user. In practice, up to six errors can be tolerated, depending on the user programmed value. The position of the acceptable errors in the SSM is limited in a way such that they have to be located within prescribed boundaries. Errors outside these boundaries will result in a failure in the SSM detection, even if the error count complies with the set rule. Whenever the SSM is not detected also the Gray code will not be detected.

Still more particularly, the invention presents a method for writing Gray code data on the disk and an associated method subsequently to reliably detect it. Briefly, and in accordance with a preferred embodiment of the invention, prior to recording the Gray code data onto the data media, the Gray code information is encoded. In a preferred embodiment, the encoding is accomplished using a redundant 4:12 rate code that imposes severe constraints on the minimum and maximum run length of 0's and 1's. A 12:4 decoder at the output of the Viterbi detector recover the original Gray code from the encoded bit sequence. It should be appreciated that other Gray code encoding schemes may be equally advantageously employed, as will be evident to those skilled in the art. The object of any encoding scheme selected should be to reduce the probability of errors at the output of the Viterbi detector.

Thus, in accordance with the invention, the advantages of these constraints can be exploited in a modified five state Viterbi detector having a structure that is tailored to the encoding scheme. By using the encoding scheme of the invention, a very low probability of errors in the detection of the bit stream with an advantage of almost 4 dB in the pre-detection signal to noise ratio (SNR) over a standard uncoded Viterbi detector can be achieved.

Moreover, the coding scheme is such that the variation of the magnetization pattern between adjacent tracks also is minimum. This means that the fundamental property of the Gray code is preserved in the encoded data, and the uncertainty in the track identification remains at ±1 track.

As described above, data is generally recorded onto concentric circular paths on a circular data media, typically a magnetic media or the like. A typical format for the data on the servo section on each concentric track is shown in FIG. 1. The order of the data shown in FIG. 1 is typical; however, the order may vary from one disk drive to another depending on the manufacturer, the particular format selected for the drive format, and so on. It will be understood, of course, that although the track format is shown as a linear function, the individual signal fields will follow the particular circular tracks on the media on which they are recorded.

The particular pattern 10 of FIG. 1 is arranged continuously, beginning with a servo address mark (SAM) followed by a preamble field 14. The preamble field is followed by a servo sync mark (SSM) 16, which is followed by the sector ID 18 and track ID 20 fields, which are represented by an encoded Gray code, according to the invention. Following the sector and track ID fields 18 and 20, a number of bursts 22, 24, . . . , 26, and 28 are recorded, followed by a write splice 30. The write splice 30 connects the servo sector to the data sector where the data is stored. The servo and data sectors alternate along the track. The servo sectors are usually confined in servo wedges evenly spaced on the disk surface.

Figure 2:
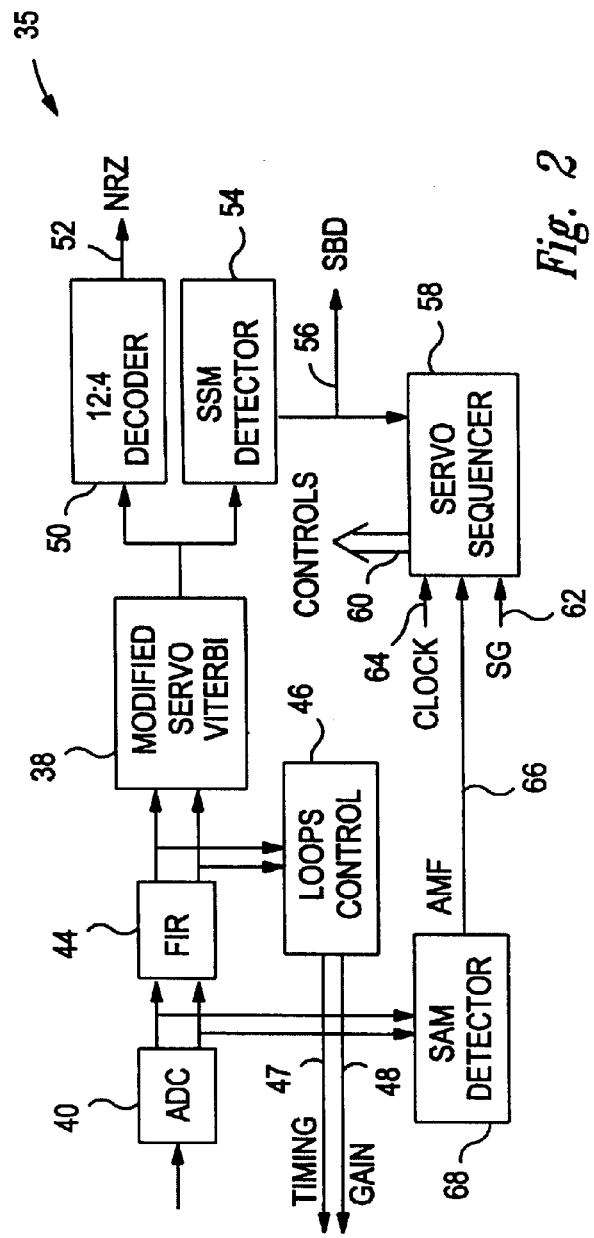
FIG. 2 is a box diagram showing a circuit for reading data contained on data tracks of the type shown in FIG. 1, using a modified Viterbi detector, in accordance with a preferred embodiment of the invention.

A channel circuit 35 for reading the data contained on the data tracks is shown in box diagram form in FIG. 2. The signal which is read from the data tracks is preamplified and equalized (preamplifier and equalizer not shown) and applied to an analog to digital converter (ADC) 40, which converts the analog signals recorded on the data media to provide a digital signal to a finite impulse response filter (FIR) 44 and to a SAM detector 68. The FIR, which equalizes the samples to the Viterbi target, provides outputs to the modified servo Viterbi detector 38 and to the loops control circuit 46, which provides timing and gain control signals, respectively, on lines 47 and 48. (Due to the low data density during servo, the use of a prefilter (not shown) may be enough in most of the cases to equalize servo data. In these cases the FIR 44 can be bypassed giving a latency advantage to the loop control circuitry 46.)

The output from the modified servo Viterbi detector 38 is connected to a 12:4 decoder 50, which provides an output on a nonreturn to zero (NRZ) encoded line 52. The output from the modified servo Viterbi detector 38 is additionally connected to the input of a servo sync mark detector 54, which provides a Sync Byte Detect (SBD) output 56, as well as an input to a servo sequencer 58.

The servo sequencer 58, which generates all the control signals needed to the servo channel to operate, receives a sync gate signal 62, a clock signal 64, and an Address Mark Found (AMF) signal 66 as inputs, and provides the servo control signals on output bus 60. The AMF signal is developed by an SAM detector 68, the inputs of which are derived from the output of the ADC 40.

The servo circuit of FIG. 2 is similar to that used in the data read circuitry. The external interface is reduced to minimum in this type of servo. Basically only the servo gate signal line 62 is needed to control the servo channel 58. All other information between the controller and the channel are exchanged using the existing parallel and serial ports Also the SBD line 56 is shared between servo and read mode.

Through the use of the channel circuit of FIG. 2, the sector and track identification codes that form the Gray code are read from the disk using the prescribed encoding technique. By virtue of this encoding, the probability of error is reduced when the reading of the Gray code is performed. Moreover, the encoding makes the servo positioning process more reliable.

It should be noted that in practice, the encoded Gray code values will be written to the Gray code fields during an initial formatting of the disk. In the subsequent read back process, this data will be automatically detected and decoded, and only the original Gray code will be provided to the controller. As noted, the code has a 4:12 efficiency. The actual length of the Gray code field is therefore three times the length of the Gray code information. In order to detect the encoded Gray code, according to the invention, an ordinary Viterbi detector may be used to detect the encoded Gray code data; however, many of the advantages derived from the use of the modified Viterbi detector will be lost. Thus, to exploit the advantage of the 4:12 coding, the modified and simplified Viterbi detector 38 is preferably used, the details of which being shown with reference now to FIG. 3.

Figure 3:
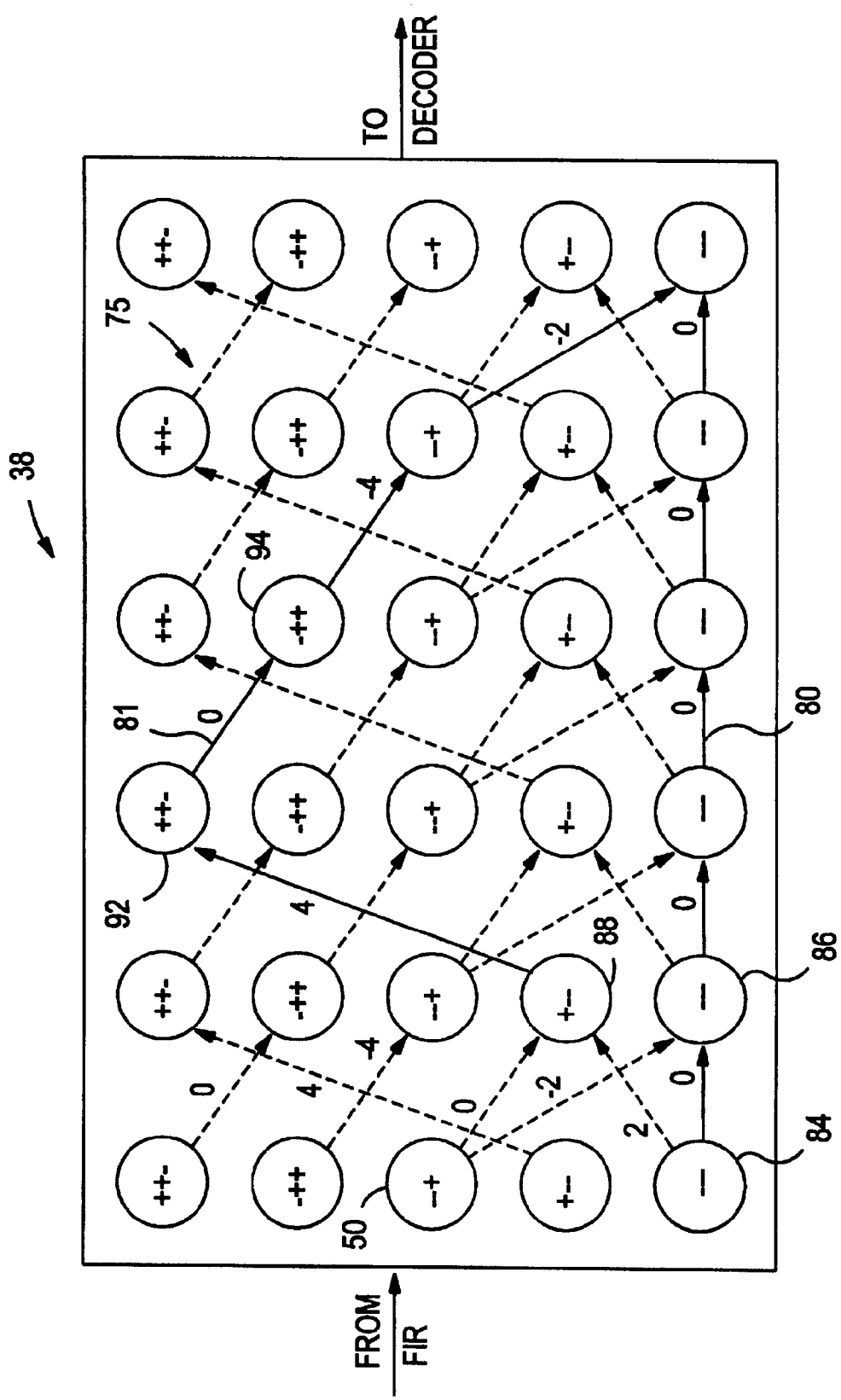
FIG. 3 is a trellis diagram showing the operation of a modified Viterbi detector, which may be used in the circuit of FIG. 2, in accordance with a preferred embodiment of the invention.

As mentioned, the construction of full state Viterbi detectors is well known in the art, and the manner by which each Viterbi state can be constructed will be evident to those skilled in the art. Each circle in FIG. 3 represents three bits of consecutive binary data. For example, state 84 represents a data state in which the past of the data stream is "000". From this state, it is possible to move to two possible next states, state 86, if the output of the FIR 44 is "0" or state 88, if the output of the FIR 22 is "2". (It is noted that the bit stream is represented from left to right in the designations within each of the states 75).

At this point, several observations can be made. It is noted that the proposed servo Gray code and Sync Mark detection is based on synchronous maximum likelihood sequence detection of widely-known enhanced, class-four, partial response (EPR4) samples. Also, as noted, servo Gray code information is encoded using a rate 4:12 run-length-limited code that satisfies (d, k)=(2, 10) constraints. That is the number of 0's in a row cannot be more than 10 and less than 2. To increase the minimum distance of error events, and to decrease the number of such events, only two consecutive ones are allowed in a row. An example code word is 000110011000. With this coding scheme, there is only one minimum distance error event with a squared distance of 40. This error event is shown with solid line 80 and 81.

Thus, at the outset, the Gray code encoding scheme excludes the sequences 010, 101 and 111, which allows the number of states in a standard Viterbi detector to be reduced from 8 to 5, and to enable 9 out of 16 branches which otherwise would be required to be eliminated. Note, for example, in the Viterbi detector 38, only states "011", "110", "100", "001", and "000" need be included. This results in a significant reduction in the complexity of the detector and in its implementation. Also, the combination of the code and the reduced state Viterbi increases the minimum squared distance error by a factor of 2.5 with respect to an uncoded full-state detection. This gives a 4 dB advantage in the pre-detection SNR and makes the Gray code detection more reliable.

Figure 4:
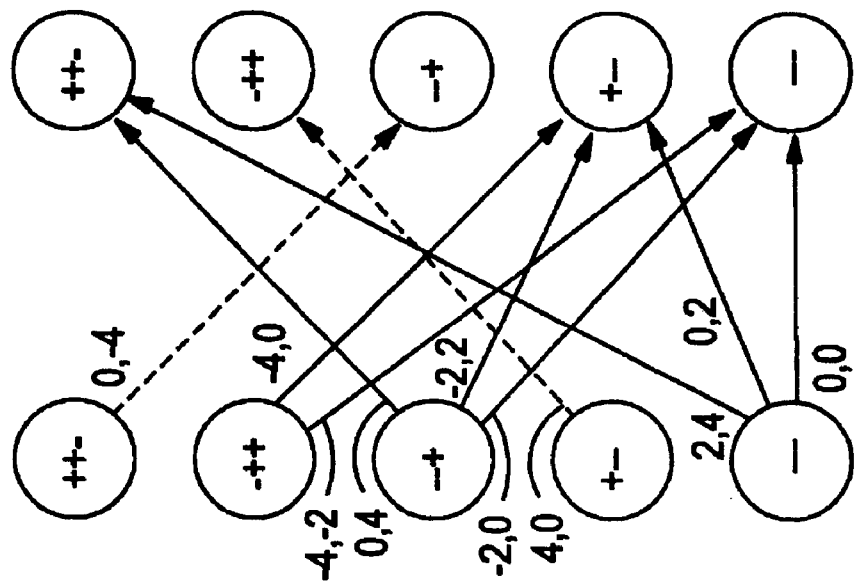
FIG. 4 shows two equivalent trellis diagrams for processing two samples and making two decisions concurrently and simplification thereof, in accordance with a preferred embodiment of the invention.
Figure 4:
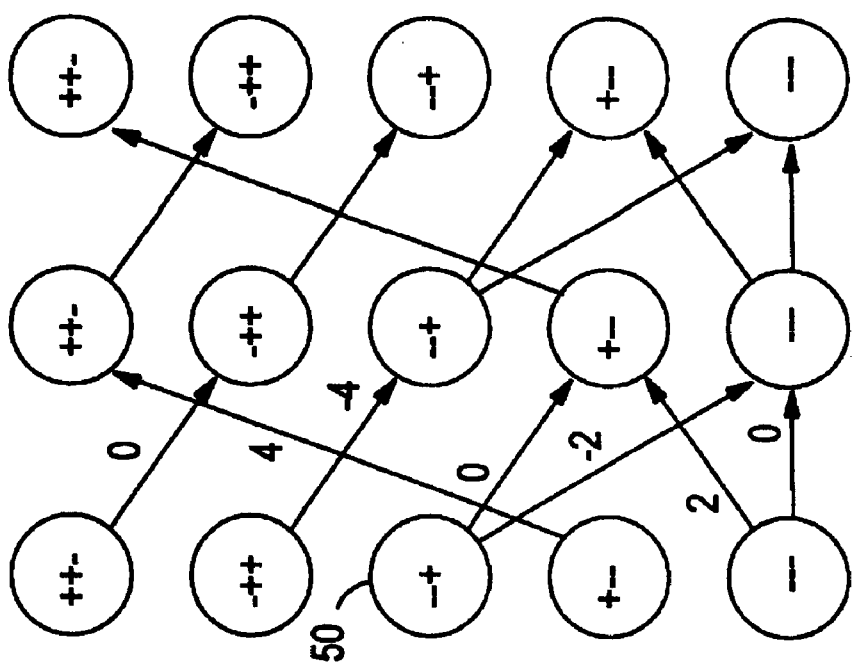

Additionally, the construction of at least some of the states within the Viterbi detector 38 may be simplified, as well. Assuming, for example, that state 88 was entered, it can be seen that two possible paths of entry may have occurred. The first is from state 84 as described. The second is from state 90, had the past history been "001", and a "1" bit was received. However, under either path by which state 88 was entered, a "1" bit value brought the Viterbi to that state. Importantly, since under the data construction rules defined for this particular implementation, one bit value of "1" cannot be alone, i.e., two "1" values must occur, there is only one path by which state 88 may be exited. That is, when a bit value of "1" is received, the only state that may be entered is state 92, representing a data history of "011". Furthermore, once state 92 is reached, only one exit path exists, since no more than two "1" bit values may occur. That leads to the state 94. Consequently it can be seen that the implementation of state 92 does not require the input selection and output choice considerations of other states, for example of state 86. This simplification may be realized in many of the other states, as well. Thus, the construction of the Viterbi detector 38 can be greatly reduced. Thus the modified Viterbi detector 38 only requires four add-compare-select units to make decisions out of 10 branches, as can be seen in the state analysis shown in FIG. 4.

Figure 5:
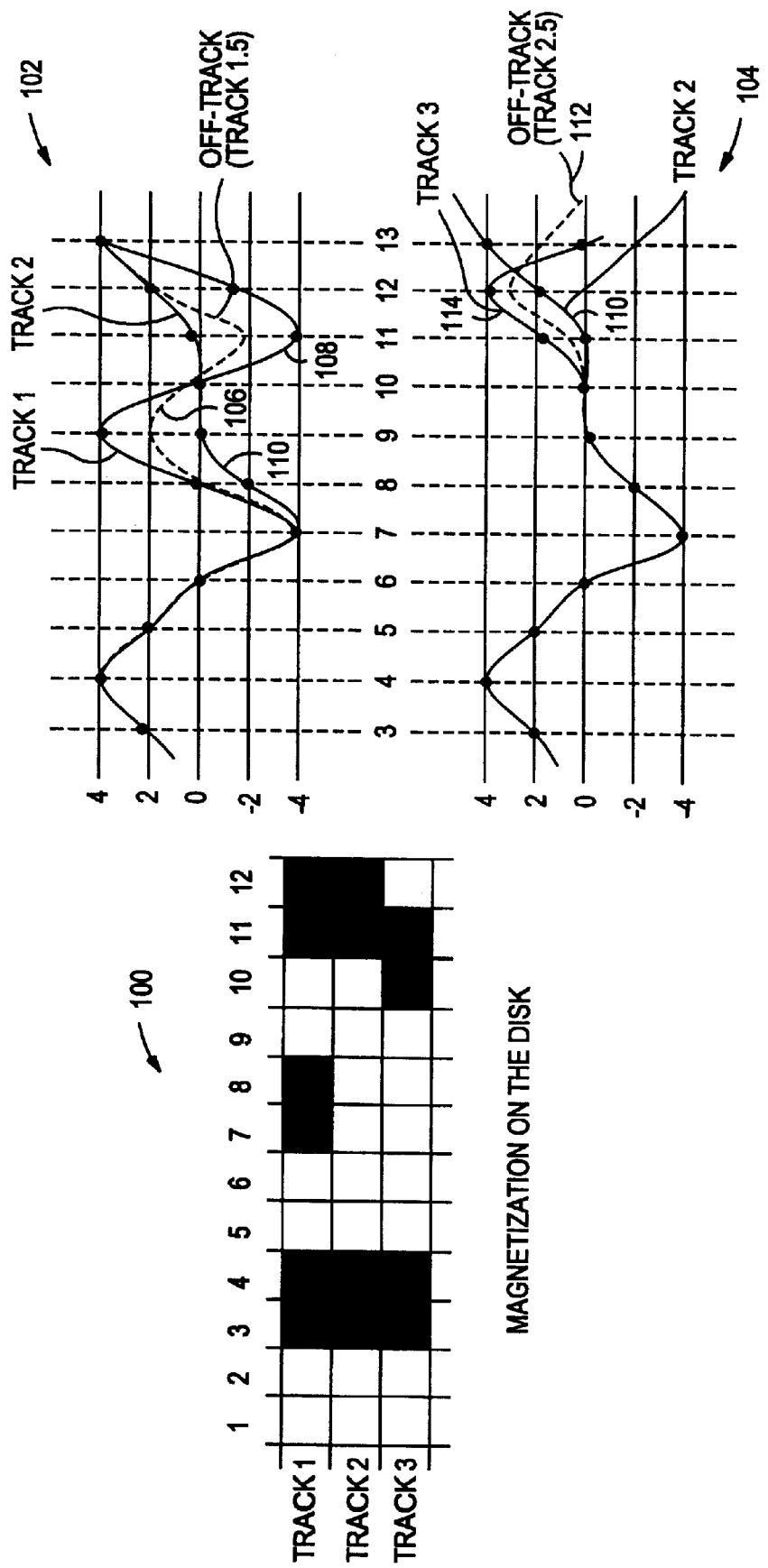
FIG. 5 shows a diagram of magnetization regions on various tracks of a magnetic data media, and resulting voltage curves detected by a read head for respective track 1 and track 2 and for track 2 and track 3, including the expected voltages when the head is located between the respective track pairs.

With respect to the encoded data itself, it can be seen that on the disk, the encoding arrangement of 16 12-bit code words guarantees that the error in the track identification still is always detected within 1 track error tolerance, even when the head is placed in an off-track position. Two examples are shown in FIG. 5. In FIG. 5, the magnetization pattern on the disk is shown by the diagram 100, and the resulting voltage waveforms produced by the head are shown by the waveforms 102 and 104. Thus, if the head is located in the middle of the tracks 1 and 2, the off-track waveform 106 of the read-back voltage will be as shown, between the values it would produce if it were properly aligned with track 1 108 or track 2 110. Due to the pruning and state reduction, the only allowed sequences at the output of the modified Viterbi decoder for this input could only be 001100000011 or 001100110011, which represent the magnetization patterns of tracks 1 and 2.

In the second example, when the head is in between tracks 2 and 3, the off-track waveform 112 will be as depicted, again with the dashed line. For such a waveform, the legal Viterbi decisions can only be 001100000011, or 001100000110. Again, these are the patterns of track 2 110 and track 3 116.

Applying the rules that the magnetization patterns of adjacent tracks can only differ by a 1 bit shift of two consecutive 1's or by the replacement of two 0's with two 1's, one of the possible arrangement is as shown in the diagram 100. For each magnetization pattern, the left column of the figure indicates the corresponding Gray code at the output of the decoder.

Figure 6:
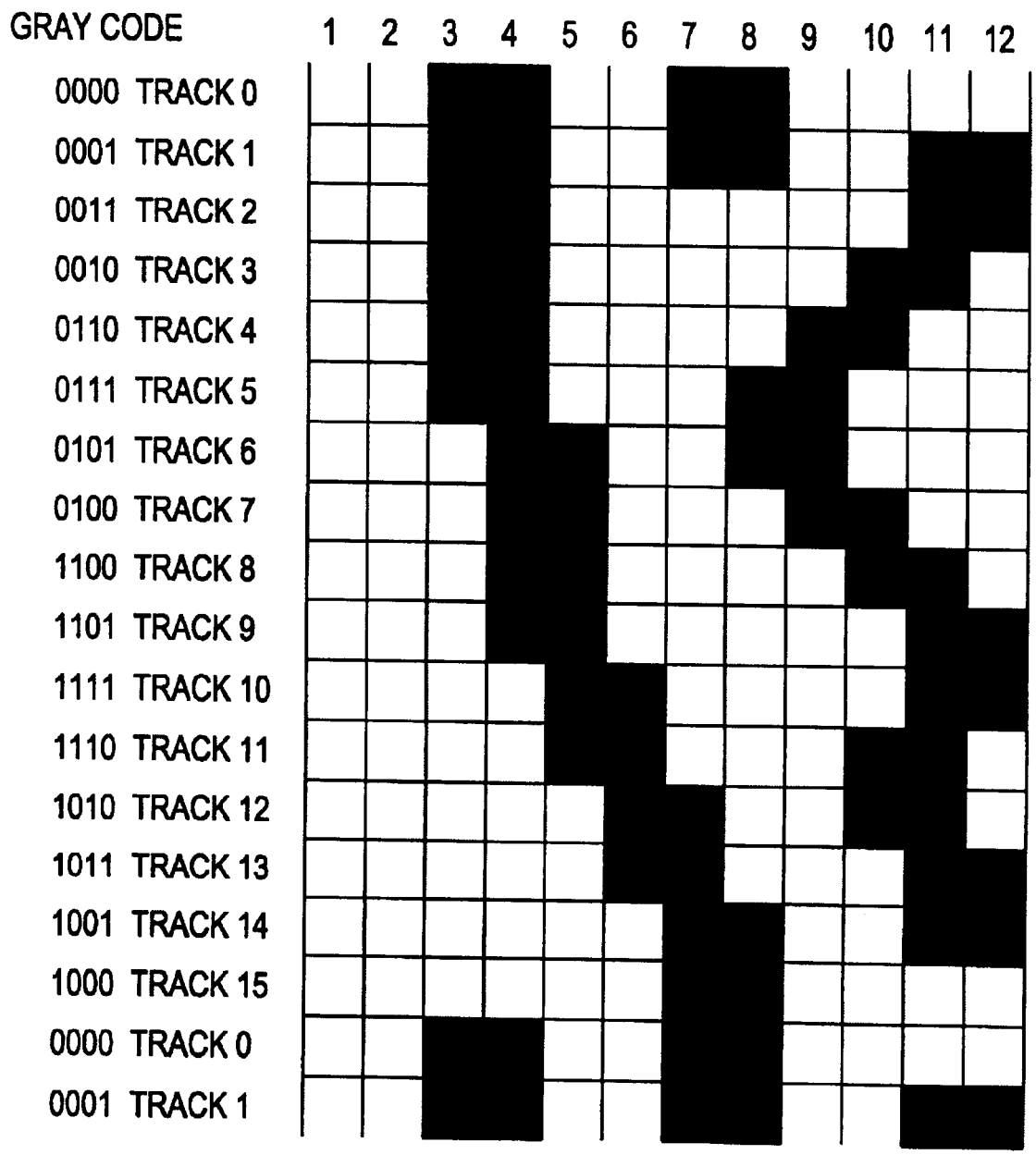
FIG. 6 is a diagram showing a typical magnetization pattern of encoded Gray code data on a magnetic media to provide location code information for positioning a magnetic head of a mass storage device, or the like, in accordance with a preferred embodiment of the invention.

Although various encoding schemes can be used to realize the advantages of the invention, one salient feature of the code described above is that each code word guarantees at least two flux changes on the disk. This helps the timing and gain loop to remain lock on the data during tracking. This can be seen, for example, from the diagram of FIG. 6, which shows the magnetic pattern on the disk formed by the sequential encoded Gray codes, shown in FIG. 7.

Once the encoded Gray codes are detected by the Viterbi detector, they can be decoded by a simple look-up table that converts block of 12 bits at the Viterbi output in the corresponding 4 bits Gray code sequence, using, for example, the table referred to above in FIG. 7. This means that the Gray code information must be a multiple of 4 bits. If this is not the requirement of the particular servo system in which the invention is practiced, extra 0's may be concatenated at the beginning of the Gray code area in such a way to comply with this rule. It can be seen that using this technique, the maximum payload will never exceed 3 bits. For example with 6 bits of sector identification information and 16 bits of track identification information, two 0's must be added at the beginning of sector ID to bring the total to 24 bits that will be encoded in 4 bit blocks. The total Gray code length is never expected to exceed 3 bytes.

Nevertheless, the length of the Gray code can be programmed by the user according to the particular system requirements in which the invention is practiced. The servo detector does not distinguish between sector and track information, and the information will be decoded and output sequentially. It is up to the controller to distinguish the two types of information. FIG. 8 shows, for example, various ways by which the lengths of the Gray code and channel bits may be programmed.

If an error occurs during the reading process an invalid code word can appear at the output of the Viterbi. In this case, the channel will assert the erasure flag and will decode the incorrect code word as 0H.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A method for synchronously detecting servo information from a data disk, comprising:
   reading servo information from said disk that has been encoded in a known data format from Gray code data to obtain a servo information signal, said encoded Gray code data constrained to allow no more and no fewer than two "1" states to sequentially occur; and
   passing said servo information signal through a Viterbi detector that has been modified to eliminate state changes that do not occur within said constrained encoded Gray code data.

2. The method of claim 1 wherein said encoded Gray code is further constrained to allow no more and no less than two "1" states to sequentially occur.

3. A method for synchronously reading Gray code servo information from a data disk, the method comprising:
   reading encoded Gray code data from the disk, said encoded Gray code data constrained to allow no more and no fewer than two "1" states to sequentially occur;
   detecting the encoded Gray code data in a Viterbi detector having only permissible state change transitions that are permitted by a Gray code data encoding scheme that prohibits some adjacent data states to produce detected encoded Gray code data; and
   decoding the detected encoded Gray code data.

4. The method of claim 3 wherein said decoding the detected encoded Gray code data comprises looking up a decoded Gray code value in a lookup table of encoded Gray code states.

5. The method of claim 3 wherein said decoding said encoded Gray code data further comprises adding preceding "0" states to said encoded Gray code data, if necessary, to cause said encoded Gray code data to be a multiple of 4 bits.

6. A method for operating a mass storage device of the type having a rotating media with a plurality of data containing locations and a corresponding plurality of identification locations for containing information to identify associated ones of said data containing locations, wherein said information to identify associated ones of said data containing locations includes location code data at each identification location that follows a Gray code scheme among successive identification locations, and having a data head that is selectively positioned adjacent said media for at least reading data from said data containing locations, comprising the acts of:
   locating said head to a data containing location at an actual head position;
   reading encoded location code data with said head from an identification location corresponding to said actual head position to produce a read encoded location code data signal, said encoded location code having at least some prohibited adjacent data states;
   detecting said read encoded location code data signal using a Viterbi detector which allows state transitions only to states that would not be produced by said prohibited data states to produce a detected encoded location code data signal;
   decoding said detected encoded location code data signal to recover Gray code location data that is constrained to allow no more and no fewer than two "1" states to sequentially occur;
   determining from said encoded Gray code data whether said actual head position is a desired head position;
   if said actual head position is said desired head position, reading information from said data containing location;
   and if said present location is not said desired head position, repeating said steps from said act of locating.

7. The method of claim 6 wherein said encoded location code comprises encoded Gray code data having a constraint in which a number of 0's in a row cannot be more than 10 and less than 2.

8. The method of claim 6 wherein said act of reading encoded location code data comprises synchronously reading said encoded location code data.

9. The method of claim 6 wherein said act of decoding said encoded location code data comprises looking up a decoded Gray code value in a lookup table of encoded Gray code states.

10. The method of claim 6 wherein said act of decoding said detected encoded Gray code data further comprises adding preceding "0" states to said encoded Gray code data if necessary to cause said encoded Gray code data to be a multiple of 4 bits.

11. A mass storage system, comprising:
   a moving data medium having a plurality of data tracks and a corresponding plurality of data track location fields respectively associated therewith, wherein said successive adjacent data track location fields contain encoded Gray code data having at least some prohibited adjacent data state combinations, the encoded Gray code data in a data track location field of a track differing from the encoded Gray code data in a data track location field of an adjacent track by a one-bit shift of two consecutive "1's" or by a replacement of two consecutive "0's" with two consecutive "1's";

a data reading head that is selectively locatable to a data track location at an actual head position to read reading encoded location code data corresponding to said actual head position and produce a read encoded location code data signal;

a Viterbi detector for detecting said read encoded location code data signal, said Viterbi detector being configured to allow state transitions only to states that would not be produced by said prohibited data states to produce a detected encoded location code data signal;

a decoder for receiving said detected encoded location code data signal to recover Gray code location data from which the actual location of said data head can be determined.

12. The mass storage system of claim 11 wherein said moving data medium is a rotating magnetic medium.

13. The mass storage system of claim 11 wherein said encoded Gray code data comprises Gray code data that has been encoded using a 4:12 run-length code that satisfies a constraint wherein a number of 0's in a row cannot be more than 10 and less than 2.

14. The mass storage system of claim 13 wherein said encoded Gray code is further constrained to allow no more and no less than two "1" states to sequentially occur.

15. The mass storage system of claim 11 wherein said Viterbi detector contains both add-compare-select and add state functions.

16. A method for writing servo information to a data disk for synchronous detection, comprising:

encoding servo information from Gray code data to obtain encoded servo information that has at least some prohibited adjacent data state combinations and that is constrained to allow no more and no fewer than two "1" states to sequentially occur; and writing said encoded servo information to servo sectors of a data media to identify said servo sectors;

whereby said encoded servo information signal may be detected by passing said encoded servo information through a Viterbi detector that has been modified to eliminate state changes that would be caused by said prohibited adjacent data state combinations.

17. The method of claim 16 wherein said encoding comprises encoding Gray code data using a 4:12 run-length code that satisfies a constraint wherein a number of 0's in a row cannot be more than 10 and less than 2.

* * * * *